United States Patent [19]
Marcinkiewicz

[11] Patent Number: 5,371,785
[45] Date of Patent: Dec. 6, 1994

[54] TELEPHONIC CONSOLE WITH MULTIPERSONALITY CONTROL APPARATUS AND METHOD

[75] Inventor: David A. Marcinkiewicz, Geneva, Ill.

[73] Assignee: Rockwell International Corporation, El Segundo, Calif.

[21] Appl. No.: 927,198

[22] Filed: Aug. 7, 1992

[51] Int. Cl.$^5$ .................. H04M 3/42; H04M 1/02
[52] U.S. Cl. .................. 379/267; 379/265; 379/201; 379/308; 379/357
[58] Field of Search .......... 379/308, 307, 265, 266, 379/267, 357, 201, 96, 387, 390

[56] References Cited

U.S. PATENT DOCUMENTS

| | | | |
|---|---|---|---|
| 4,677,657 | 6/1987 | Nagata et al. | 379/357 |
| 4,759,056 | 7/1988 | Akiyama | 379/216 |
| 4,897,866 | 1/1990 | Majmudar et al. | 379/96 |
| 4,928,306 | 5/1990 | Biswas et al. | 379/201 |

OTHER PUBLICATIONS

Matuo et al., "Personal Telephone Services Using IC—cards" Jul. 1989, IEEE Communications Magazine pp. 41–48.

Perry, Tekla, "ISDN devices unveiled," Jun. 1989, The Institute (IEEE) p. 9.

Primary Examiner—James L. Dwyer
Assistant Examiner—Daniel S. Hunter
Attorney, Agent, or Firm—C. B. Patti; H. F. Hamann

[57] ABSTRACT

An automatic call distribution system (12) for interconnecting units (16) of an external telephonic network (18) with telephonic consoles (10) capable of multiple functions, a console personality control apparatus having a personality reset card (40) carrying information identifying a personality reset function, a card connector socket module (26) for releasable connection with the personality reset card (40), a memory (32) for storing a plurality of console function personalities and a microprocessor (20) for reading the personality reset card identifying information when the personality reset card is connected with the console (10) to reset the console function personality.

17 Claims, 5 Drawing Sheets

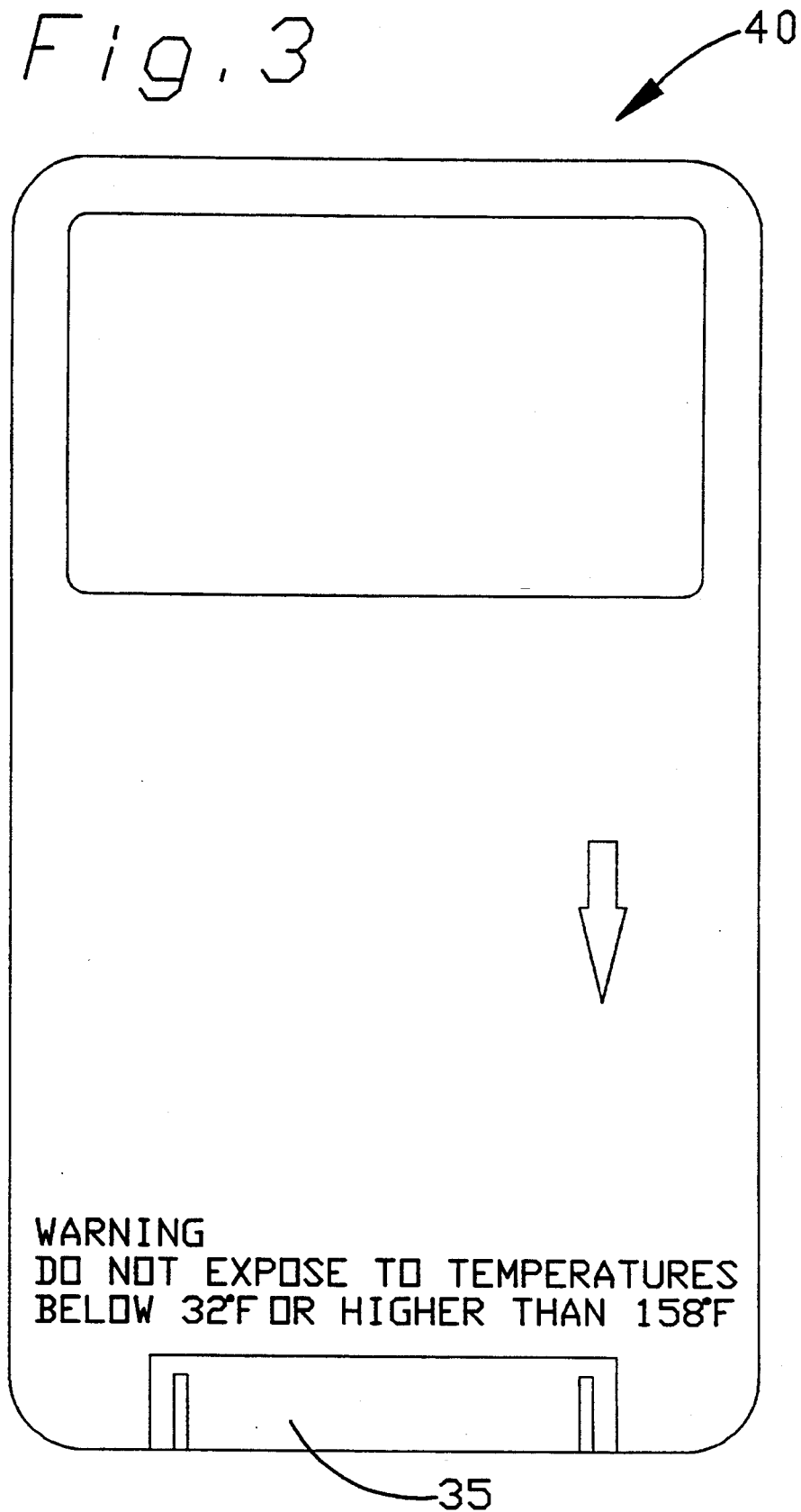

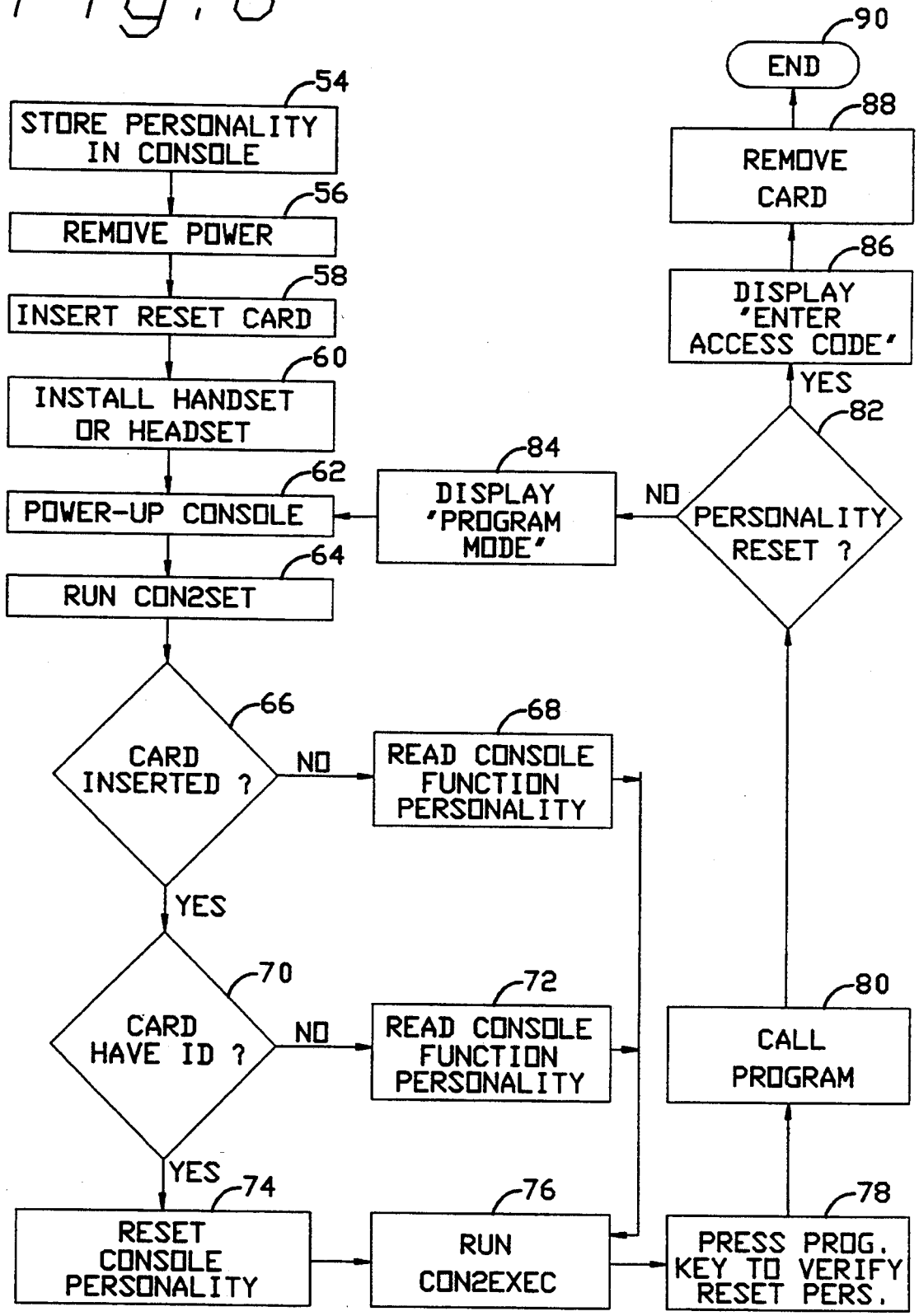

TELEPHONIC CONSOLE WITH MULTIPERSONALITY CONTROL APPARATUS AND METHOD

BACKGROUND OF THE INVENTION

1. Field of the Invention

This invention relates generally to the field of telephonic consoles and, more particularly, to telephonic consoles used in an automatic call distribution system having multiple modes of operation.

2. Description of the Related Art Including Information Disclosed Under 37 C.F.R. §1.97-1.99

Telephonic console units having multiple function personalities are known. Each different personality is defined by a unique set of preselected functional characteristics such as the meaning of different indicators, the response to different key strokes and functional capabilities. Each different personality is programmed into the console to make the console function in a correspondingly different manner. In a call distribution system, the programmed personalities typically correspond to different types of users, such as customer service agents, supervisors, billing representatives, etc. In addition to each programmed personality, a default personality is also set at the manufacturing facilities to provide original program mode parameters for the various functions of the console in the absence of selection of one of the programmed personalities. Since the consoles contain multiple personalities, each console functions as an agent unit, a supervisory unit, a billing representative unit or any other personality type depending on the personality setting of the console.

However, in the known multipersonality consoles, the change from one console personality to another (i.e. from agent to supervisor) requires disassembly by a technician. Once the console housing is taken apart, the technician has to short two locations on the console printed circuit board subassembly and then power up the console to change the personality. Then the console is reassembled. Since this is a complicated and sophisticated process, many service representatives are not equipped to do this necessary change over work on site. Accordingly, the consoles are returned to the manufacturing or other central technical facility to reset the personality. The need for technically skilled individuals and the sending of consoles from a customer site to a manufacturing facility contributes to substantial maintenance costs for changing the personality of a console.

SUMMARY OF THE INVENTION

It is therefore the principal object of the present invention to provide an apparatus for automatically resetting the personality of a telephonic console without the need of disassembling the console.

An object of the invention is to provide a console personality control apparatus for resetting a console function personality to a default personality.

The object of the present invention is achieved by providing in an automatic call distribution system for interconnecting telephonic units of an external telephonic network with a plurality of telephonic consoles capable of multiple functions a console personality control apparatus having a personality reset card carrying information identifying a personality reset function, means associated with the console for releasable connection thereto of the personality reset card, means associated with the console for storing a plurality of console function personalities and means for reading the personality reset card identifying information when the personality reset card is connected with the console for automatically enabling the console to reset the console function personality to the one personality identified by the information read by the personality reset card. In the preferred embodiment, the one personality identified by the personality identification card is a default personality from which the other nondefault personality may be programmed into the console.

The object of the invention is also achieved by provision in an automatic call distribution system for interconnecting telephonic units of an external telephonic network with a plurality of telephonic consoles capable of multiple functions, a method of controlling of the personalities of a console, comprising the steps of (1) storing a plurality of console function personalities in a memory location within the console, (2) releasably connecting a personality reset card carrying identification reset information to a mating card connector socket of the console, (3) reading the identification reset information from the personality reset card and (4) resetting the console function personality to a personality identified by the information read from the personality reset card identification information.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 3 is a side view of a card preferably used to enable reprogramming of the nonvolatile memory to establish a new personality;

FIG. 6 is a flow chart illustrating the steps for resetting the console personality.

DESCRIPTION OF THE PREFERRED EMBODIMENT

Figure 1:
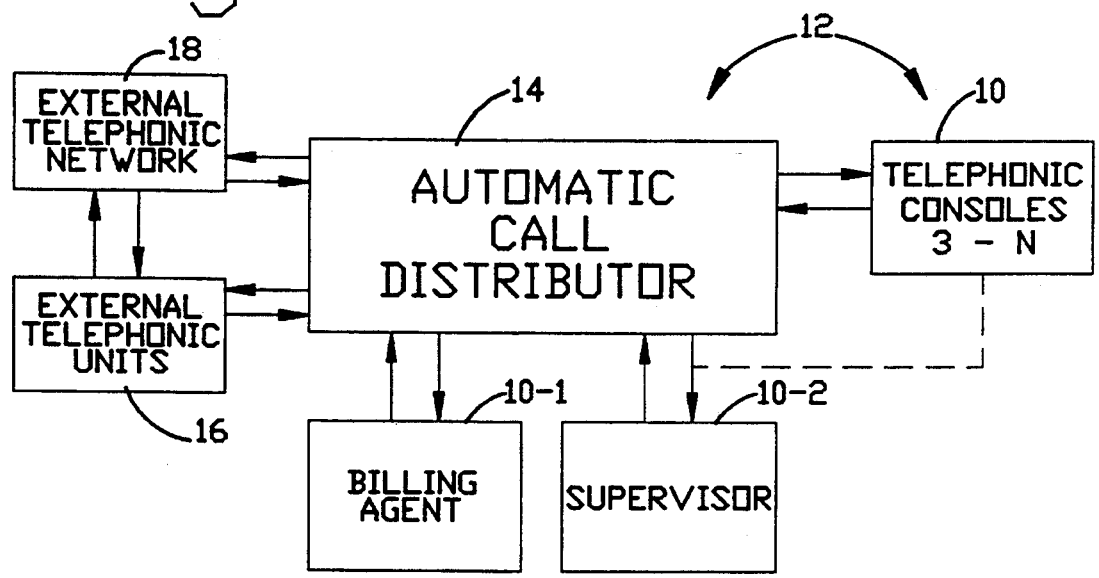
FIG. 1 is a functional block diagram of an automatic call distribution in which the telephonic consoles of the present invention are preferably employed.

Referring to FIG. 1, a plurality of the card programmable telephonic consoles 10-1-10-N of the present invention, generally designated telephonic consoles or console 10 herein, seen as used in an automatic call distribution system 12. The system 12 has an automatic call distributor 14 which interconnects incoming calls from external telephonic units 16 of an external telephonic network 18 with at least some of the plurality of telephonic consoles 10. The automatic call distributor, or ACD, 14 includes a multiport, multiplexing telephonic switch, a central processing unit and an associated memory, not shown. The details of the ACD 14 forms no part of the invention, but reference should be made to U.S. patent application Ser. No. 07/770,197 of Jones et al. filed Oct. 2, 1991; U.S. Ser. No. 07/416,077 of Jones et al. filed Sep. 29, 1989, issuing as U.S. Pat. No. 5,140,611 on Aug. 18, 1992 and U.S. Pat. No.

5,127,004 of Lenihan et al. issued Jun. 30, 1992 for an example of the ACD in which the preferred embodiment of the present invention is associated.

Figure 4:
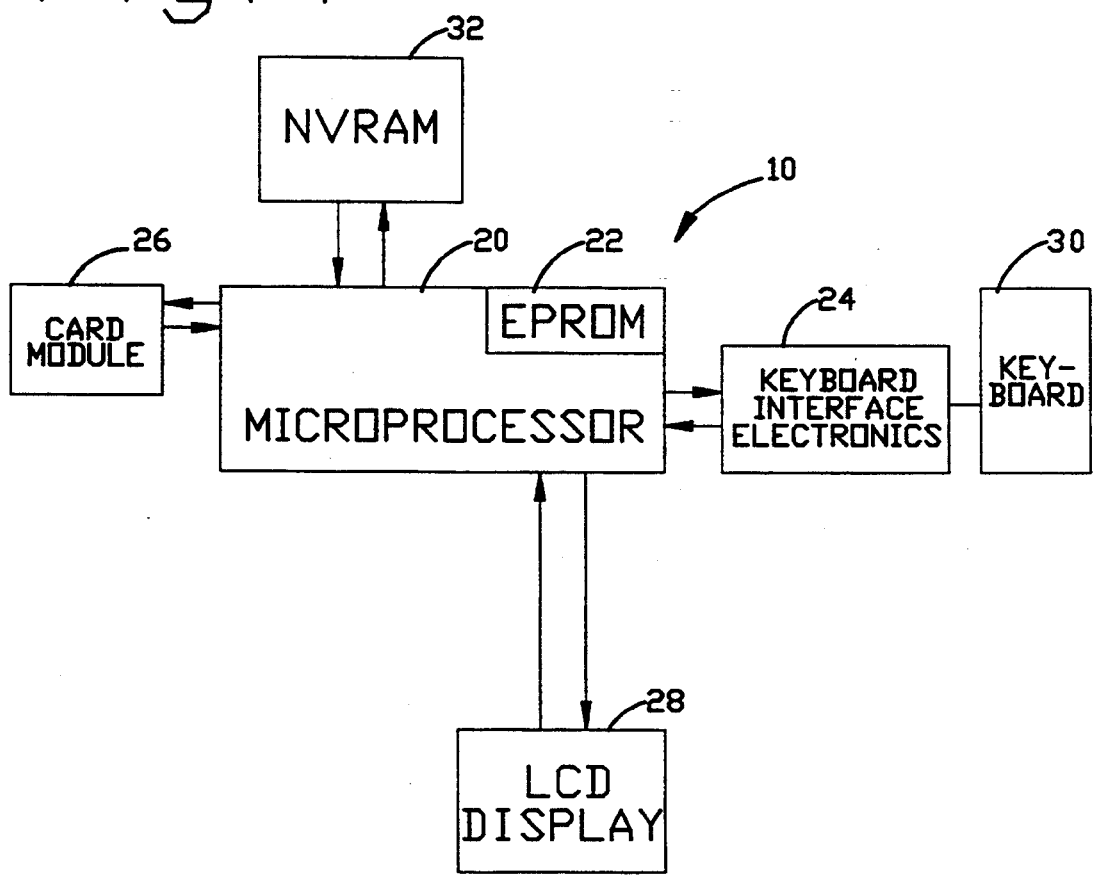
FIG. 4 is a functional block diagram of the telephonic console of FIGS. 1 and 2.
Figure 2:
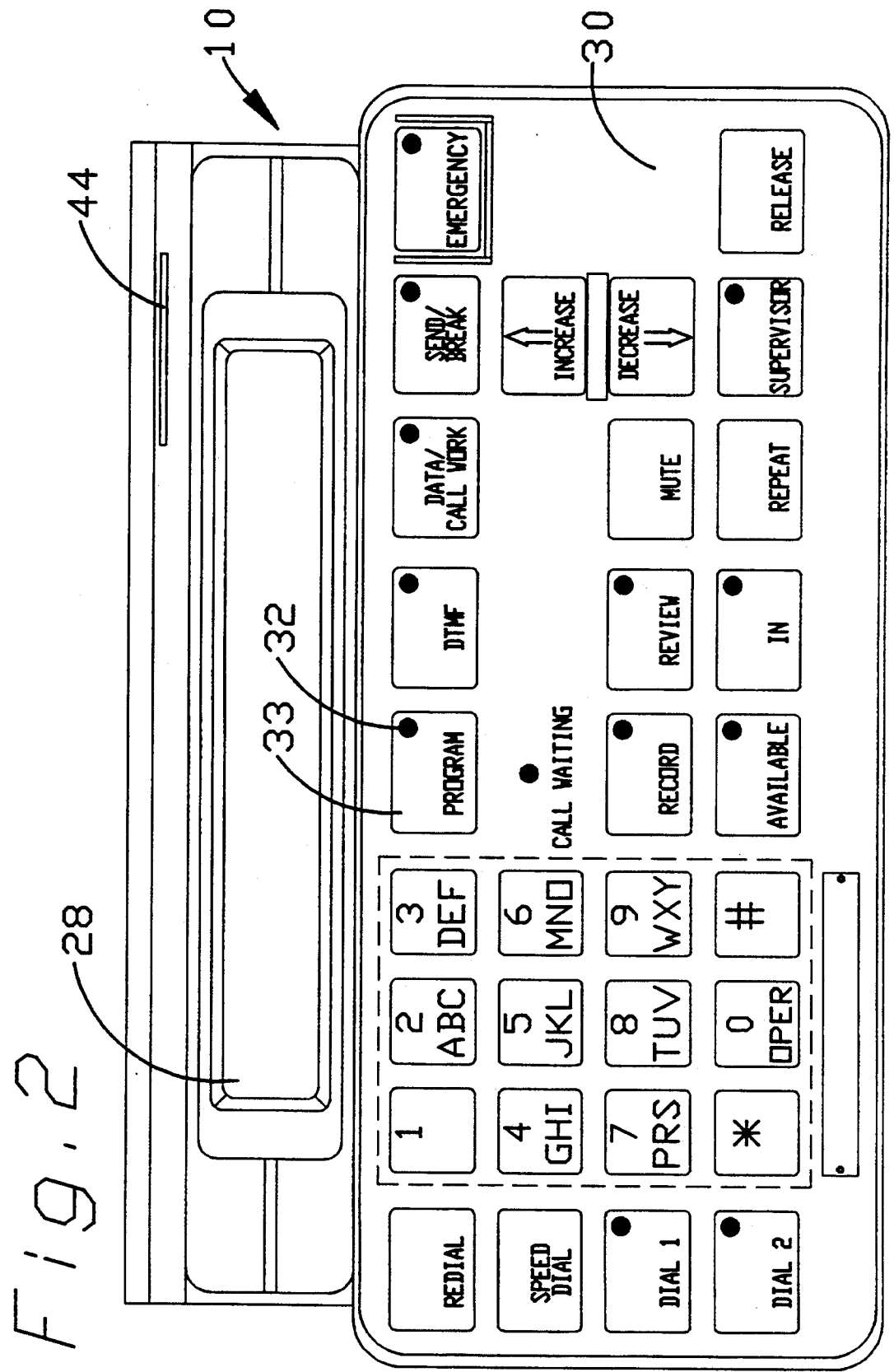
FIG. 2 is a plan view of a preferred embodiment of the telephonic console of the present invention.

The personality reset card 40 of FIG. 3 is inserted into the slot 44, FIG. 2, of the console 10 for releasable connection with the card module or mating card connector socket 26, of FIG. 4. The personality reset card 40 carries information identifying a personality reset function in the memory of the card. The personality reset card 40 has sixty connector pins located at an edge 35 of the card, FIG. 3, which mate with corresponding connectors of the card module 26, FIG. 4.

The personality reset card 40, FIG. 3, used in the preferred embodiment is an 8-bit data bus static ram card having 128 k byte memory. The card 40 has dimensions approximately the size of a credit card (86 mm×54 mm×3.4 mm) and is a model MF3128 manufactured by Mitsubishi Electronics. The card 40 has two connector pin rows at the card edge 35 with each row having thirty pin connectors. The personality reset card 40 is coded with two data bytes at specified address points in the card memory. These two unique data pattern bytes provide the information for identifying the card as being a personality reset card and thus initiates the console 10 to reset its existing personality to the personality identified by the information the card when the reset card information is read. In the preferred embodiment, the existing console function personality is reset to a nonfunctional default personality.

Referring to FIG. 4, each of the telephonic consoles 10 includes a microprocessor 20 preferably an 80C32, made by Intel. The microprocessor 20 operating program is stored in an associated erasable programmable read only memory, or EPROM 22, preferably a 32 k×8 EPROM. The console 10 of the preferred embodiment contains an 80c32 microprocessor and the necessary logic circuitry to communicate with the console electronics such as the keyboard interface electronics 24. The microprocessor 20 operates at a crystal clock frequency of 16,000 MHz to insure proper baud rate. The keyboard 30 is multiplexed using a 4-bit write latch and an 8-bit read latch in the keyboard interface electronics 24. An LCD display 28 of the console 10 preferably has an eighty character display capacity consisting of two lines of forty characters each. The display is preferably accessed by a single data write operation.

Console program mode parameter data is stored in a nonvolatile random access memory (NVRAM) 32 which is preferably a 1k bit (64×16) memory. The plurality of multiple function personalities for the console are stored in the NVRAM 32. The NVRAM 32 stores a set of parameters corresponding to each of the plurality of stored console function personalities. The card connector socket 26 preferably comprises a sixty pin connector for receipt of the associated reset card 40. Such card connector socket models 26 have spring loaded mating connectors.

In response to the personality reset card 40, FIG. 3, being inserted and connected to the card module 26, FIG. 4, the microprocessor 20 reads the card identifying information on the personality reset card. In response to reading the reset card identifying information, the microprocessor 20 enables the console 10 to reset the console function personality to the one personality which is identified by the unique data information in the personality reset card 40, FIG. 3. The microprocessor 20, FIG. 4, identifies the inserted card 40 as being a personality reset card and, in the preferred embodiment, automatically resets the console function personality existing on the console 10 to a default personality. The default personality in the NVRAM 32 of the preferred embodiment contains the parameter settings for the functionality of the console as originally programmed at the factory or manufacturing facility. One of a plurality of console function personalities placed in the NVRAM 32, FIG. 4, is set upon installation of the console 10 at a customer site. For example, the selection and programming of the agent personality in the NVRAM 32 enables the console 10 to perform those functions assigned to an agent. The setting of the supervisor personality stored in the NVRAM 32 enables the console 10 to perform the functions which a supervisor has. Once the personality of the console is programmed, the personality reset card 40, FIG. 3, is required to reset the existing personality for the console unit 10, FIG. 4.

In the preferred embodiment, once the personality reset card 40, FIG. 3, is installed in the card socket module 26, FIG. 4, the programmed console function personality, (i.e. agent personality, supervisor personality, billing representative personality, station master personality) is cleared when the power is first applied to the console 10. All the function parameters are returned to their original factory default settings.

Figure 5:
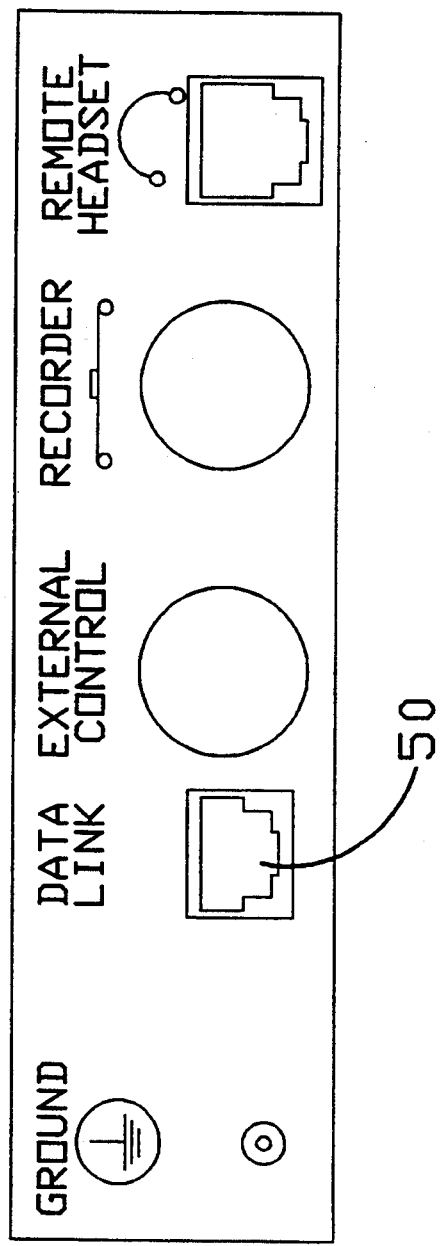
FIG. 5 illustrates the console back panel for power installation of the console.

In the preferred embodiment, the following procedure is followed to reset the programmed console function personality to the default personality. The power is removed from the console by disconnecting the "data link" (72 Kbs//Power) eight line cable from the data link jack 50, FIG. 5, at the rear of the console 10, FIG. 2. The personality reset card 40, FIG. 3, is inserted, connector side down, into the slot 44, FIG. 2, of the card socket module 26, FIG. 4 until the card seats into its corresponding mating connector in the module. As a precondition for initiating a personality reset, a handset or headset (not shown) is installed into the console 10. The eight line "data link" cable is connected back into the data link jack 50, FIG. 5, to power-up the console 10. The lamp 32 on the Program key 33, FIG. 2, on the console keyboard 30 lights, indicating the console microprocessor 20, FIG. 4, is attempting to reset the program mode parameters including the personality of the console 10.

In response to initialization or power-up of the console, the CON2SET routine located in the EPROM 22, FIG. 4, of the microprocessor 20 is run. CON2SET is a collection of subroutines used to store and retrieve parameter information from the NVRAM 32. The CON2SET routine first asks if a card 40 is inserted at the card connector module 26. If no card 40, FIG. 3, is connected, then the microprocessor 20 reads the existing console function personality data in the NVRAM 32. Thus, the console 10 maintains its set personality. If a card 40, FIG. 3, is inserted in the connector module 26, CON2SET asks if the card has the unique identification data at the specified address in the memory of the inserted reset card 40, FIG. 3. If there is no identification information data read at the location specified by CON2SET, then the card is not a personality reset card 40 and the microprocessor 20, FIG. 4, reads the parameter data in the NVRAM 32 corresponding to the set console function personality. If the unique data patterns (i.e. the identification information) are read at the specified address in the inserted card, then the card is identified as a personality reset card 40, FIG. 3.

Since the personality reset card 40 is detected, the console function personality is reset. The console type stored in the NVRAM 32, FIG. 4, is erased and the EPROM 22 operating code instructs the microprocessor 20 to write a set of default parameters in the NVRAM 32 and the console personality type is set to none. The existing console function personality (i.e. agent, supervisor etc.) is reset to the default personality having the default factory parameter settings.

The CON2EXEC routine located in the EPROM 22 is executed once initialization or power-up is complete. The CON2EXEC module is the main scheduler of the console features and is the primary loop used to control the console operator interface. The CON2EXEC manages the user initiated keyboard features. The user of the console 10 verifies the resetting of the personality by the actuation of the Program key 33, FIG. 2, located on the keyboard 30 of the console. In response to the Program key 33 being pressed, the PROGRAM subroutine of CON2EXEC which supports the program feature is called and executed. The PROGRAM routine is a feature manager which performs console parameter selection functions dynamically based on user initiated keyboard key strokes. A key stroke or actuation on the Program key 33, FIG. 2, causes the PROGRAM function in the EPROM 22, FIG. 4, to examine the external variable CONTYPE (i.e. the personality of the console). If the personality is reset to a default personality (CONTYPE=0), an LCD message "Enter Setup Access Code" is displayed on the LCD display 28, FIG. 2, of the console 10. The message appears on the display 28 through the initialization of the LCD interface routine associated with CON2EXEC and located in the EPROM 22, FIG. 4. This indicates to the user or operator that the console personality is reset to a default state and prompts the operator for his access code to set a new functional personality for the console 10. If the console function personality has not been reset by CON2SET, then the PROGRAM routine sends another LCD message "Program Mode" to the LCD display 28 FIG. 2, of the console 10. The displaying of these messages verifies whether resetting of the console function personality has taken place. This indicates to the user or operator that the console function personality has not been reset. The operator of the console 10 must remove the power to the console and repeat the same procedure to attempt to reset the console personality.

Additionally, the card connector module or releasable connecting means 26, FIG. 4, is also capable of connection with a voice card which is physically like the personality reset or identification card. The voice card, however, carries voice data selectively played by the console to incoming callers from external telephonic units 16, FIG. 1, from the external telephonic network 18. The microprocessor 20, FIG. 4, of the console 10 has its associated EPROM 22 programmed to both read the voice card when in the reading position and to play back prerecorded voice messages to callers and to read the personality reset card 40, FIG. 3, when in the reading position in the card module 26, FIG. 4, to reset the console function personality.

While the advantages of the invention are preferably obtained with the automatic call distribution system 12 described above with reference to FIG. 2, the method of the invention can be practiced with any other call distributor systems having an automated call distributor 14 for selectively interconnecting a plurality of external telephonic units 16 of an external telephone network 18 with a plurality of telephonic consoles 10. In any event, the steps of the preferred method of practicing the invention comprise the steps of (1) storing a plurality of console function personalities in a memory location within the console, (2) releasably connecting a personality reset card, carrying identification information, to a mating card connector socket of the console, (3) reading the identification information of the personality reset card, and (4) resetting the console function personality to a personality identified by the personality reset card in response to the identification information being read from the personality reset card.

Referring to FIG. 6, this method is preferably performed in the console 10, FIG. 4, by storing a plurality of console function personalities in a nonvolatile random access memory 32, FIG. 4 (NVRAM) located within the console 10, as seen in step 54 of FIG. 6. The operating code for the various personalities is located in the erasable programmable read only memory (EPROM) 22 associated with the microprocessor 20. The data for the plurality of console function personalities is inserted in the NVRAM 32. A set of functional parameters corresponding to each of the stored console function personalities is inserted and stored in the NVRAM 32 location of the console 10. A selected set of parameters for the particular one of the personalities identified by personality identification information of the NVRAM 32 is established by the microprocessor 20 as each function is called for. If a particular function is called for, from the keyboard 14, for instance, but the personality identified by NVRAM 32 does not authorize that function, the console is disabled and will not perform the unauthorized function. The default personality is also insertabe and stored in the NVRAM 32 when written from the EPROM 22. The default personality is the console function personality having the programmed parameter settings which are originally set at the manufacturing or factory location. The default personality is originally inserted into the nonvolatile memory 32 at a factory site. These personalities define what functions can and cannot be performed on the console 10. For example, one of the console function personalities such as an agent personality, may provide for recording of calls, while another type of personality such as a supervisor personality does not allow for recording of calls.

The preferred method of resetting a personality on a console includes the step of removing the power from the console 10, FIG. 2, as seen in step 56 of FIG. 6. This is done by disconnecting the data link cable from its corresponding socket 50, FIG. 5, at the rear of the console 10. In step 58, the personality reset card 40, FIG. 3 is releasably connected into the mating card connector socket 26, FIG. 4, which is connected with the microprocessor 20. In step 60 the handset or headset (not shown) is installed into the telephonic console 10. The console is powered-up or initialized by connecting the data link 8 line cable inserted back into its datalink jack 50, FIG. 5, at console 10 as seen in step 62. The step of releasably connecting the card 40, FIG. 3, is performed before power is applied to the console and the steps of reading and resetting are performed when power is first applied to the console 10.

In step 64, the CON2SET routine in the EPROM 22, FIG. 4. is run to read the identification information contained in the memory of the personality reset card 40, FIG. 3. The routine asks in step 66, FIG. 6, if a card is inserted in the console 10. If no card is inserted, then in step 68 the console function personality is read from the NVRAM 32. If a card is inserted and connected to the console 10, then in step 70, FIG. 6, CON2SET asks if the card has the unique identification data located at the specified address within the card. If there is no unique data patterns, then in step 72 the existing console function personality data is read from the NVRAM 32, FIG. 4. If the card 40, FIG. 3, does have the identification information data pattern at the specified address then the console personality is reset in step 74. The microprocessor 20 EPROM 22 is programmed to look for the presence of a personality reset card 40, FIG. 3, connected to the reset card socket 26 upon power up of the console 10. The reading of the identification information from the personality reset card triggers the microprocessor 30 to reset the console function personality existing on the console 10 to a default personality. In step 74 the microprocessor 20, FIG. 4, clears the existing console function personality and writes to the NVRAM. The NVRAM 32 is initialized with a default personality. All the parameter selections (i.e. triggers, contrast, audio levels, etc.) are returned to their factory default settings. After initialization or power-up, the CON2EXEC routine is run in step 76. In step 78, the user or installer verifies the resetting of the console personality. This is done by pressing the program key 33, FIG. 2, on the console 10. Since the program key was actuated to verify the resetting the PROGRAM subroutine in KYBDFEAT of CON2EXEC is called and run in step 80. The PROGRAM routine sees and verifies if the personality is reset to dafault in step 82. In response to the pressing of the program key 33, a message is displayed on the LCD display 28 of the console 10 to indicate if the console function personality is reset. If a "enter/setup access code?" message appears in step 86, FIG. 6, then the personality is reset. If another message, "program mode" appears on the LCD display 28 in step 84, FIG. 6 the console function personality has not been reset and the installer must go back to step 56 and repeat the above mentioned steps. In step 88, the personality reset card is removed from the slot 44, FIG. 2, of the mating card socket. At step 90, FIG. 6 the procedure for resetting the personality ends. Additionally, it is also noted that the method of controlling the console 10 includes removing the personality reset card 40, FIG. 3, from the releasable connecting means 26, FIG. 4, connecting a voice card with stored voice data to the releasable connecting means in lieu of the personality reset card after the console function personality has been reset, and employing the voice card to play back voice messsages to incoming calls to the console 10.

For further details with regard to the voice card, the telephonic console and the related features, reference should be made to the following applications filed contemporaneously herewith and assigned to the same assignee of the present invention: U.S. patent application Ser. No. 07/927,896 of Zdenek et al. entitled "Telephonic Console Nonvolatile Personality Memory and Method" filed Aug. 7, 1992. and U.S. patent application Ser. No. 07/926,891 of Zdenek et al. entitled "Telephonic Console with Prerecorded Voice Message and Method", filed Aug. 7, 1992. The information stored in the NVRAM 32 and the operating code for the various console functionalities for the microprocessor 20 are stored in the EPROM 22 of FIG. 4.

While a detailed description of the preferred embodiment of the invention has been given, it should be appreciated that any variation can be made thereto without departing from the scope of the invention as set forth in the appended claims.

I claim:

1. In an automatic call distribution system for interconnecting telephonic units of an external telephonic network with a plurality of telephonic consoles capable of multiple functions, the improvement being a console personality control apparatus, comprising:

a personality reset card carrying information identifying one of a plurality of console function personalities;

means associated with the console for releasable connection thereto of the personality reset card;

means at the console for concurrently storing the plurality of console function personalities; and means associated with the console for reading the personality reset card identifying information when the personality reset card is connected with the console for automatically enabling the console to reset the console function personality to the one of the plurality of personalities identified by the identifying information read from the personality reset card.

2. The console personality control apparatus of claim 1 in which the console personality function is reset to a default personality.

3. The console personality control apparatus of claim 1 in which the storing means includes a nonvolatile memory for storing a set of parameters corresponding to each of the plurality of stored console function personalities.

4. The console personality control apparatus of claim 3 in which the nonvolatile memory is a nonvolatile random access memory.

5. The console personality control apparatus of claim 1 in which the reading means includes a microprocessor at the console programmed to read the personality reset card information upon power up of the console.

6. In an automatic call distribution system for interconnecting telephonic units of an external telephonic network with a plurality of telephonic consoles capable of multiple functions, the improvement being a console personality control apparatus, comprising:

a personality reset card carrying information identifying a personality reset function;

means associated with the console for releasable connection thereto of the personality reset card;

means at the console for storing a plurality of console function personalities;

means associated with the console for reading the personality reset card identifying information when the personality reset card is connected with the console for automatically enabling the console to reset the console function personality to a default personality identified by the information read from the personality reset card; and means associated with the console for verifying the resetting of the console function personality to the default personality.

7. The console personality control apparatus of claim 6 in which the verifying means includes a key on the console, and means responsive to actuation of the key for providing a function message on a display of the console to indicate the console personality has been reset to the default personality.

8. The console personality control apparatus of claim 7 in which the verifying means includes a key on the console, and means responsive to actuation of the key for providing another message on the display to indicate the console function personality has not been reset to the personality identified by the information read from the personality reset card.

9. The console personality control apparatus of claim 2 in which the default personality has originally programmed factory parameter settings.

10. In an automatic call distribution system for interconnecting telephonic units of an external telephonic network with a plurality of telephonic consoles capable of multiple functions the improvement being a method of controlling the personalities of a console, comprising the steps of:
 concurrently storing a plurality of console function personalities in a memory location within the console;
 releasably connecting a personality reset card carrying identification reset information to a mating card connector socket of the console;
 reading the identification reset information from the personality reset card; and
 resetting the console function personality to one of the plurality of stored console function personalities identified by the identification information read from the personality reset card.

11. The method of claim 10 including the step of resetting the console function personality to a default personality.

12. The method of claim 10 in which the step of storing a plurality of console function personalities includes the step of inserting a set of parameters corresponding to each of the plurality of stored console function personalities into a nonvolatile memory.

13. The method of claim 11 including the step of inserting the default personality having originally programmed parameter settings into the nonvolatile memory at a factory site.

14. The method of claim 10 including the step of verifying the resetting of the console function personality to the personality identified by the personality reset card.

15. In an automatic call distribution system for interconnecting telephonic units of an external telephonic network with a plurality of telephonic consoles capable of multiple functions, the improvement being a method of controlling the personalities of a console, comprising the steps of:
 storing a plurality of console function personalities in a memory location within the console;
 releasably connecting a personality reset card carrying identification reset information to a mating card connector socket of the console;
 reading the identification reset information from the personality reset card;
 resetting the console function personality to a personality identified by the identification information read from the personality reset card;
 verifying the resetting of the console function personality to the personality identified by the personality reset card by actuating a key on the console and displaying a message on a display of the console to indicate the console function personality been reset to the personality identified by the identification information.

16. The method of claim 10 in which the step of reading the identification information includes the step of programming a microprocessor at the console to read the personality reset card identification information upon power up of the console.

17. The method of claim 10 in which
 said step of releasably connecting is performed before power is applied to the console, and
 said steps of reading and resetting are performed when power is first applied to the console.

* * * * *